United States Patent [19]
Purcell

[11] Patent Number: 5,501,101
[45] Date of Patent: Mar. 26, 1996

[54] DEMONSTRATION WIND TUNNEL

[76] Inventor: James R. Purcell, Rte. 6, Box 87D, Culpeper, Va. 22701

[21] Appl. No.: 187,405

[22] Filed: Jan. 25, 1994

[51] Int. Cl.[6] ................................................... G01M 9/00
[52] U.S. Cl. ................................. 73/147; 73/170.16
[58] Field of Search ......................... 73/147, 170.16, 73/170.29

[56] References Cited

U.S. PATENT DOCUMENTS

| | | | |
|---|---|---|---|
| 1,404,920 | 1/1922 | Zahn | 73/147 |
| 2,788,661 | 4/1957 | Post et al. | 73/147 |
| 3,020,754 | 2/1962 | Swanson | 73/147 |
| 3,055,212 | 9/1962 | Mackey | 73/147 |
| 3,246,512 | 4/1966 | Gyllenberg | 73/147 |
| 3,276,251 | 10/1966 | Reed, III | 73/147 |

*Primary Examiner*—Richard Chilcot
*Assistant Examiner*—Ronald Biegel
*Attorney, Agent, or Firm*—Sheldon H. Parker

[57] ABSTRACT

A portable wind tunnel features a tubular test section which has a constant cross-sectional area. The smaller end of a diffuser, which resembles a funnel, is attached to one end of the test section. The other end of the diffuser has a larger cross-sectional area. A flow generator, such as a fan, creates an airflow through the test section. The flow generator has an air inlet and an air outlet. A flow straightener is situated upstream from the air inlet of the flow generator normal to the direction of the airflow. The smaller end of a constrictor, which also resembles a funnel, is attached to the other end of the test section. The other end of the constrictor has a larger cross-sectional area.

8 Claims, 13 Drawing Sheets

DEMONSTRATION WIND TUNNEL

BACKGROUND OF THE INVENTION

1. Field of the Invention

The present invention relates to a lightweight, easy to use wind tunnel for demonstrating principles of aerodynamics in an educational setting. Overall, the wind tunnel and its components are quiet, accurate, and easy to use.

2. Brief Description of the Prior Art

Full size wind tunnels have been used for years to test the aerodynamics of automobiles and airfoils (wings). As people have become more environmentally conscious, designers of vehicles have once again turned their focus toward fuel conservation. One way of increasing the fuel efficiency of a vehicle is to streamline its shape. A streamlined shaped poses less resistance to advancing air flow, allowing the vehicle to advance through the air at a given rate with greater efficiency. Vehicle designers and engineers, seeking to streamline a vehicle silhouette rely on both theoretical aerodynamics and empirical wind tunnel testing.

Aerodynamics is generally introduced in junior and senior high school science and technology classes, with a greater technical concentration coming in the later grades and college. In conjunction with a high school physics program, students learn the fundamentals of lift and drag. Lift is the component of the total aerodynamic force acting on a airfoil perpendicular to the relative wind and normally exerted in a upward direction, opposing the pull of gravity. Drag is the retarding force exerted on a moving body, such as an airfoil, by a fluid medium such as air or water. Students also learn about calculating the coefficient of drag, or $C_D$, which represents the ratio of the drag force to the dynamic pressure.

Generally, wind tunnels require a considerable investment. In addition to the financial resources required, a typical wind tunnel will also require significant periods of time to begin and maintain an extensive correlation program. Such correlation is required to ensure that the results obtained during testing will be meaningful. Some wind tunnels even require a dedicated staff to prepare and maintain the tunnel for testing. Consequently, someone desiring to use a wind tunnel for testing can anticipate incurring considerable expense and delay.

Typical wind tunnels share several common design aspects. In general, an air stream generated by a fan or blower passes through a constrictor, a test section, a diffuser, and then exits the tunnel. The fan or blower may be attached to either end of the tunnel. In an in-draft wind tunnel, the fan or blower connects to the tunnel downstream of the diffuser. When the fan or blower is activated, the air stream is pulled or sucked through the tunnel. In contrast, the air stream is pushed through a wind tunnel of the blower type. In a blower tunnel, the fan or blower attaches to the tunnel upstream of the constrictor end.

Either type of wind tunnel usually features a flow straightener attached to the tunnel directly downstream of the air inlet. In the case of an in-draft tunnel, the air is pulled into the tunnel at the constrictor end, so the flow straightener is attached to the tunnel at that point. Flow straighteners are necessary because the air around the inlet enters from all directions, not just a direction normal to the inlet. In some wind tunnels, the air stream also passes through a screen or screens. A screen helps create a Uniform velocity profile and reduce the turbulence level of the entering airstream.

The constrictor and diffuser serve related but opposing functions in a wind tunnel: the constrictor reduces the cross-sectional area available to the air stream; the diffuser increases the area available to the air stream. In conjunction, the constrictor and diffuser create a pressure drop across the tunnel, causing the air stream velocity to increase as it moves from an area of high pressure at the constrictor end across the test section to an area of low pressure at the diffuser end. The constrictor serves the added function of reducing turbulence in the entering air stream. Turbulence downstream of the constrictor is reduced directly proportional to the change in the cross-sectional area before and after the constrictor. For example, if the constrictor reduces the cross-sectional area from 4 in$^2$ to 2 in$^2$, the turbulence downstream of the constrictor will be halved In appearance, the design of a constrictor or a diffuser can resemble a funnel. A blower wind tunnel can be operated without a diffuser, but the required horsepower for the fan or blower would increase dramatically.

In operation, investigators often desire to gain a more tangible appreciation for the characteristics of the flow around a particular area of a body. To do so, a user will often probe the air stream using a tuft wand. A tuft wand is usually a thin rod with a strip of lightweight, flexible material, such as a piece of yarn, attached to the probing end. Because the rod is relatively thin, the user may introduce the tuft wand into the tunnel air stream unobtrusively by passing the probing end through a small hole upstream of the body being tested. By placing the probing end near the surface of the body being tested at a particular point, the user can understand the characteristics of the flow at ,that point. If the flexible material flutters slightly in a well-behaved manner, the flow is characterized as attached. If the flexible material flaps wildly and unpredictably, however, the flow at that point is unattached.

With respect to demonstrating the general aerodynamic fundamentals introduced above an inexpensive and far less complicated wind tunnel design than those that are currently used for full-scale or research testing will suffice. Such a wind tunnel design, suited for giving classroom demonstrations to high school students, would allow the instructor to show, e.g., how the lift and drag forces on an airfoil interact and change as the angle of attack increases. Such a design would be suited for low-end mass production, in contrast to the one-off designs used by research labs. Students could also use the wind tunnel for taking accurate wind resistance measurements and identifying the areas of greatest resistance on a body subjected to an air stream, e.g., by use of a tuft wand. One disadvantage of the previous attempts at constructing a wind tunnel suitable for demonstrations, however, is that the high noise levels resulting from operating the fan prohibited conversation between the instructor and the audience. Another drawback of earlier designs concerned their general inaccuracy and imprecision.

By limiting the goal of this design to one of demonstrating fundamentals, several benefits result. The design of the present invention is safe and simple to operate, relatively insensitive to mishandling, lightweight, inexpensive, and portable.

SUMMARY OF THE INVENTION

A portable wind tunnel features a tubular test section which has a constant cross-sectional area. The test section can be a hollow cylinder. The smaller end of a diffuser, which functionally resembles a funnel, is attached to one end of the test section. The other end of the diffuser has a larger cross-sectional area. A flow generator, such as a squirrel cage fan, creates an airflow through the test section. The flow generator has an air inlet and an air outlet. At least one flow straightener is situated upstream from the air inlet of the flow generator normal to the direction of the airflow. The flow straighteners can be constructed of a honeycomb material. The smaller end of a constrictor, which also resembles a funnel, is attached to the other end of the test section. The other end of the constrictor has a larger cross-sectional area. The air inlet of the flow generator can be attached to either the diffuser outlet or the constrictor inlet.

A tuft wand can be inserted into the airflow to indicate areas of attached and unattached flow around a test piece. A measuring system can be installed to determine the drag force on a test piece. The measuring system can feature a balance beam, a load cell, etc. A window which permits both a top view and a side view of the test piece to be seen at the same time can be made by constructing a portion of the test section out of a transparent material. This window can be removable to allow access to the test section.

A system specifically tailored for testing airfoils can be incorporated. This system can be incorporated in a module which replaces the window. This system can feature an adjuster mechanism with a lever which allows the user to position a test airfoil section within the airstream from outside the test section while the wind tunnel is in operation. Both the force on the test section and its angular attitude can be measured by using a balance beam, load cell or other similar means, and a protractor, respectively.

BRIEF DESCRIPTION OF THE DRAWINGS

The objects and features of the present invention will become more apparent from the following detailed description, especially when taken in connection with the drawings, wherein.

DETAILED DESCRIPTION OF THE INVENTION

Figure 1:
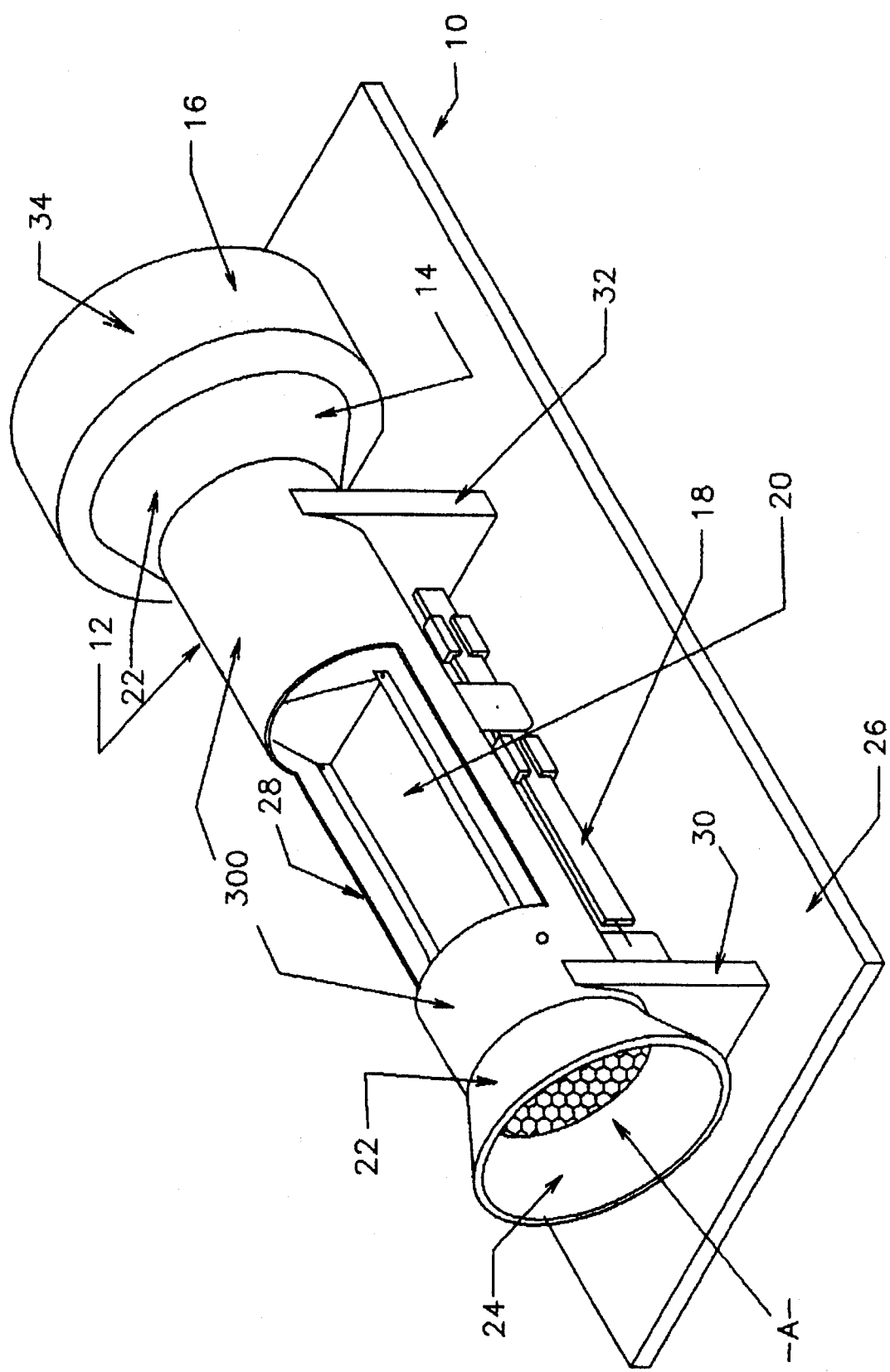
FIG. 1 is a perspective view of the assembled wind tunnel of the instant invention.
Figure 10:
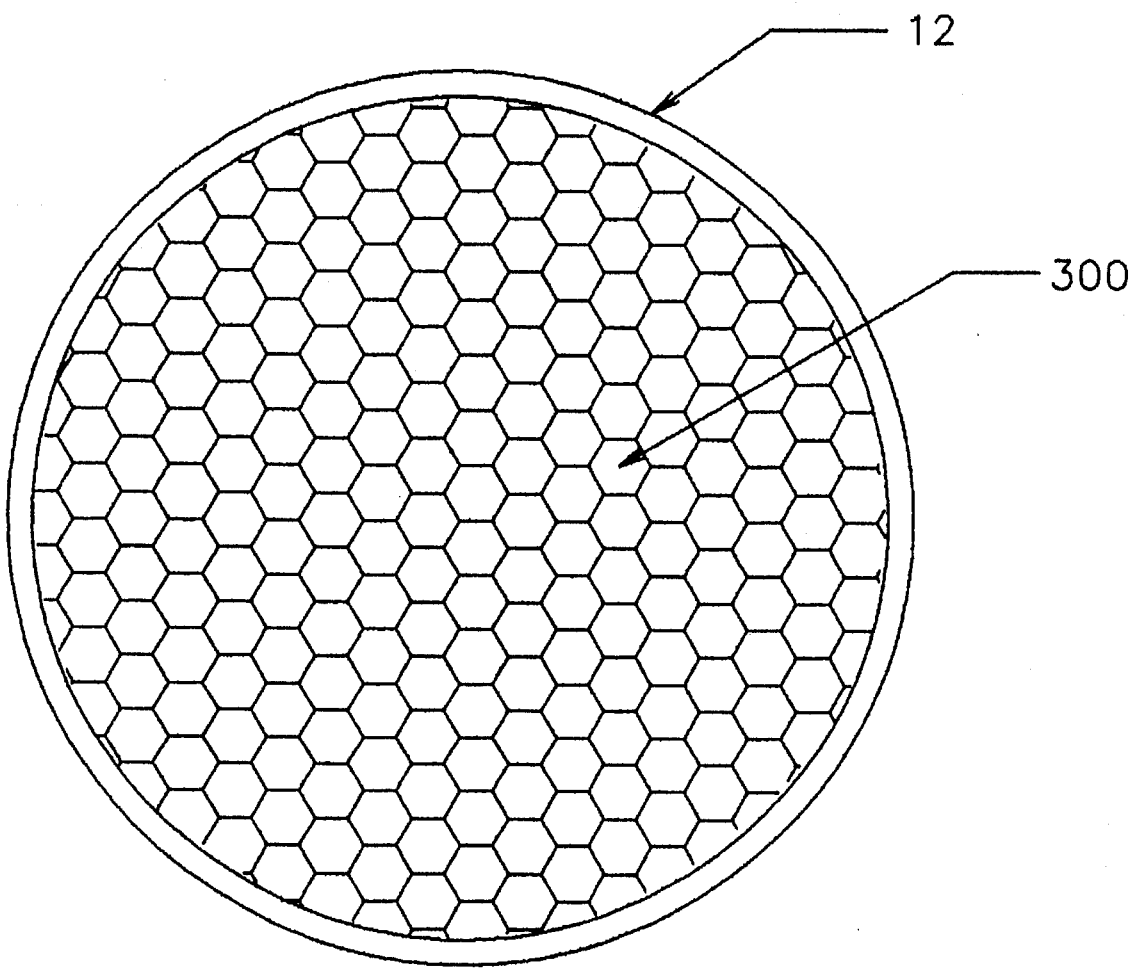
FIG. 10 is an end view of the honeycomb air straighteners of the instant invention.

Referring now to FIG. 1 of the drawings, the wind tunnel, indicated generally by reference numeral 10, is shown assembled and ready for use. The body 12 of the wind tunnel 10 is a hollow cylinder with a pair of open ends. Although the cylindrical shape is preferred, tubular material having any polygonal cross-section may be used. A window section 28 is cut out of a portion of the body 12 at approximately the center area. The wind tunnel 10, excluding the base 26, is preferably made from ¼" PVC plastic to provide a lightweight, sturdy construction which is readily available and economical. Alternatively, other materials which provide the same durability and lightweight functionality can be substituted for PVC. The vehicle platform 20 is suspended from the body 12 within the window section 28, as described in further detail below. The balance beam 18 is affixed to the bottom of the body 12, below the window section 28 and parallel to the body 12. It is critical to the functioning of the wind tunnel 10 that the balance beam 18 be allowed to freely pivot. For the least resistance and greatest accuracy, the balance beam 18 should be perpendicular to the earth. The means for connecting the balance beam 18 to the body 12 are described in detail in FIG. 3. Extension units 22 are affixed to each of the open ends of the body 12. The extension units 22 are used to span the diameter differences between the the body 12 and the air inlet 24 and air outlet 16. The extension units 22 must taper from the larger diameter of the air inlet 24 and air outlet 16 to the smaller diameter of the body 12. An abrupt decrease in diameter would cause portions of the air stream to a wall created by the size reduction, thereby preventing free air flow. The extension units 22 are provided with a honeycomb 300, shown in FIG. 10, to ensure a straight air flow and therefore more accurate testing results.

The honeycomb 300 is preferably manufactured from a thin gauge aluminum, although other materials which meet the same criteria can be substituted. Both the configuration and material of manufacture are critical to achieving the low air resistance. Circular configurations placed together, such as plastic straws, increased air resistance by approximately 20%, and therefore could not be used. The aluminum honeycomb, however, provides minimal air resistance of approximately 3%, which others such as NASA have found to be advantageous for more sensitive applications. The aluminum honeycomb material is produced by Euro-Composites of Luxembourg and is available through domestic suppliers. Although theoretical considerations alone counseled for using a single flow straightener, two are used in the present invention based on the superior results obtained from actual testing.

A squirrel cage fan 34 is positioned within the air outlet 16, drawing air through the body 12 from the air inlet 24. The squirrel cage fan 34 provides a quiet, efficient means to move air. The wind speed that results using a fan rated at 990 cubic feet per minute fan is 45 MPH, or 66 feet per second. As described above, a wind tunnel using a squirrel cage fan appears to require increased measures for straightening the air flow as compared to standard fan designs. Standard fan designs capable of moving air at the same rate operate at noise levels far above normal conversational tones, thereby prohibiting a demonstration with interactive participation between the instructor and the audience to be carried out effectively. Different fan sizes are used to provide variable wind speeds, thereby allowing multiple test situations to be investigated.

Figure 2:
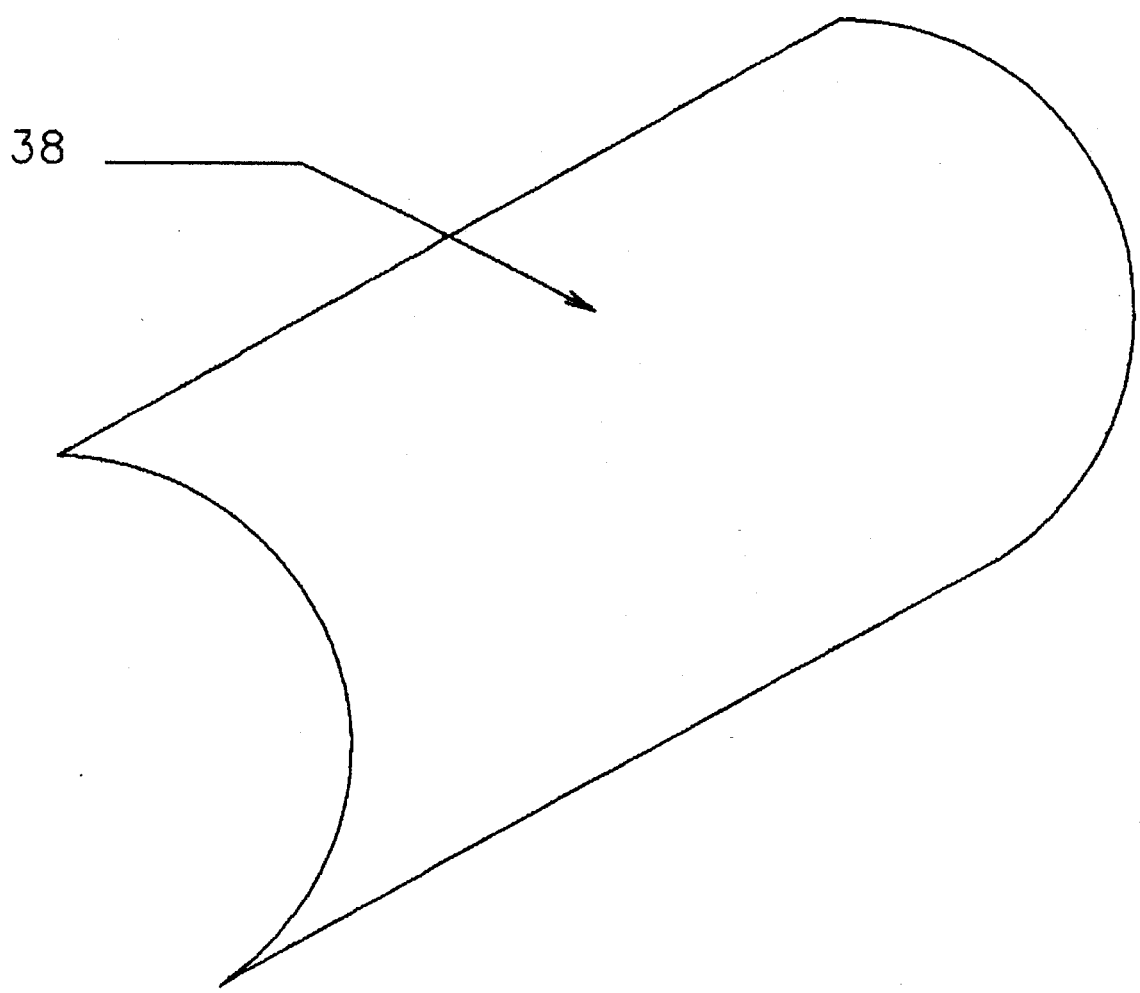
FIG. 2 is a perspective view of the window of FIG. 1.

The extension units 22 rest on support legs 30 and 32, which in turn are affixed to the base 26. The base 26 supports the body 12 and needs to be of sufficient size to provide stability for the wind tunnel 10. The base 26 can be either a permanent or portable unit. In the preferred embodiment, the base is approximately 16"×18"×48" which allows for the portability preferred in a classroom teaching device. The base 26 is preferably made from wood, although any material which provides the desired aesthetics and stability can be used. The support legs 30 and 32 are affixed to the base 26 to provide rigidity. The support legs 30 and 32 can be glued to the base 26, however, this prevents easy disassembly. Screws are the most common and economical means for fastening the support legs 30 and 32 to the base, however, other methods can be used. The legs 30 and 32 can be positioned on the extension units 22 or along the body 12, as long as stability is maintained. If the legs 30 and 32 are positioned along the body 12 of the wind tunnel 10, clearance for the balance beam 18 must be maintained. A transparent window cover 38, illustrated in FIG. 2, is placed over the window section 28 during use. The window cover 38 can be affixed to the window section 28 by any means known in the prior art, such as by using a living hinge, snap fit, etc. Use of a simple snap-fit allows easy interchangability between the transparent window cover 38 and the window cover 138, which is described in greater detail below. The transparency of the window cover 38 provides complete visibility of the effects of the air currents over the entire body of the vehicle. In the preferred embodiment, the window cover 38 allows the user to view both the top and the side of the object being tested.

Figure 3:
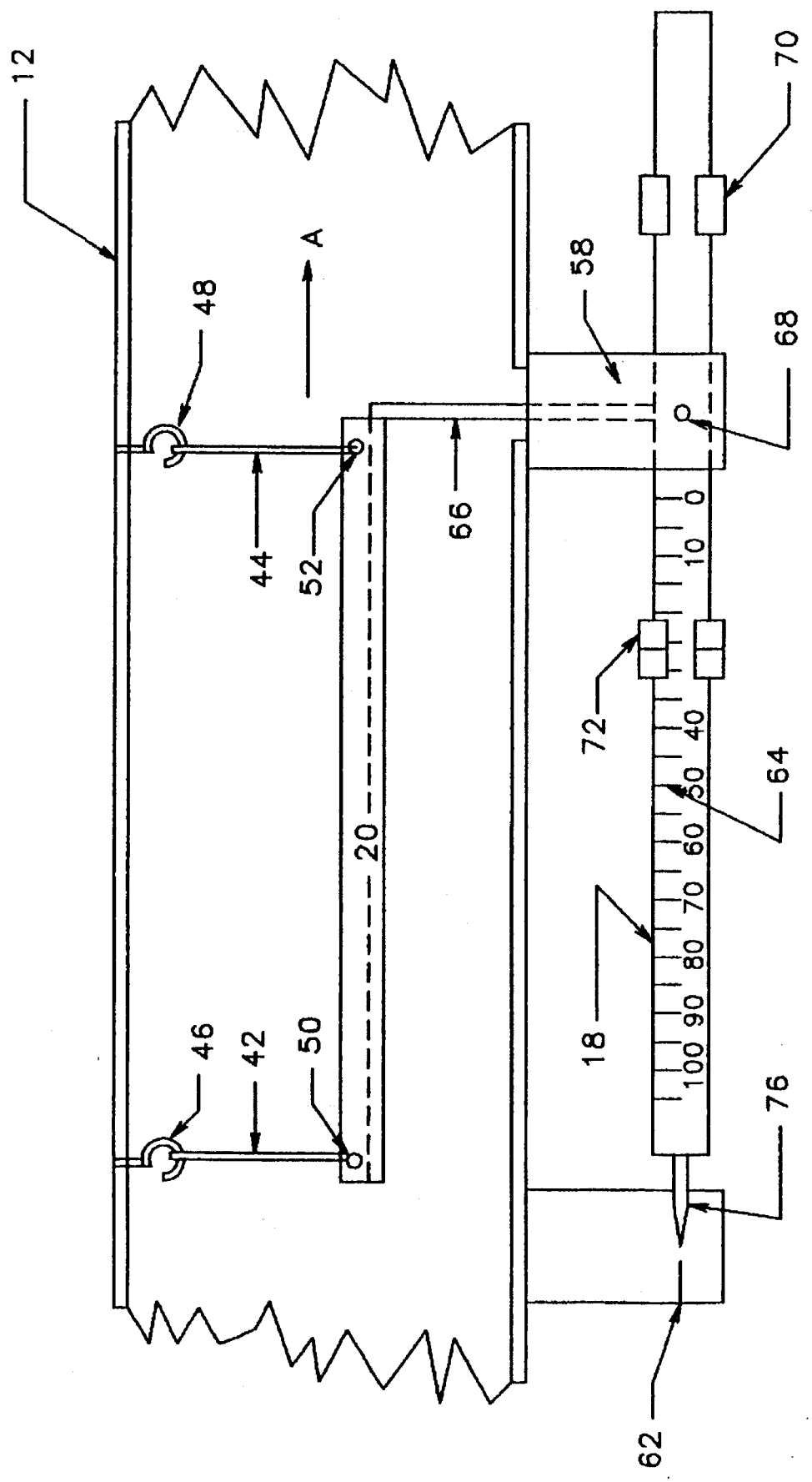
FIG. 3 is a cut away front view of the instant invention in FIG. 1.
Figure 4:
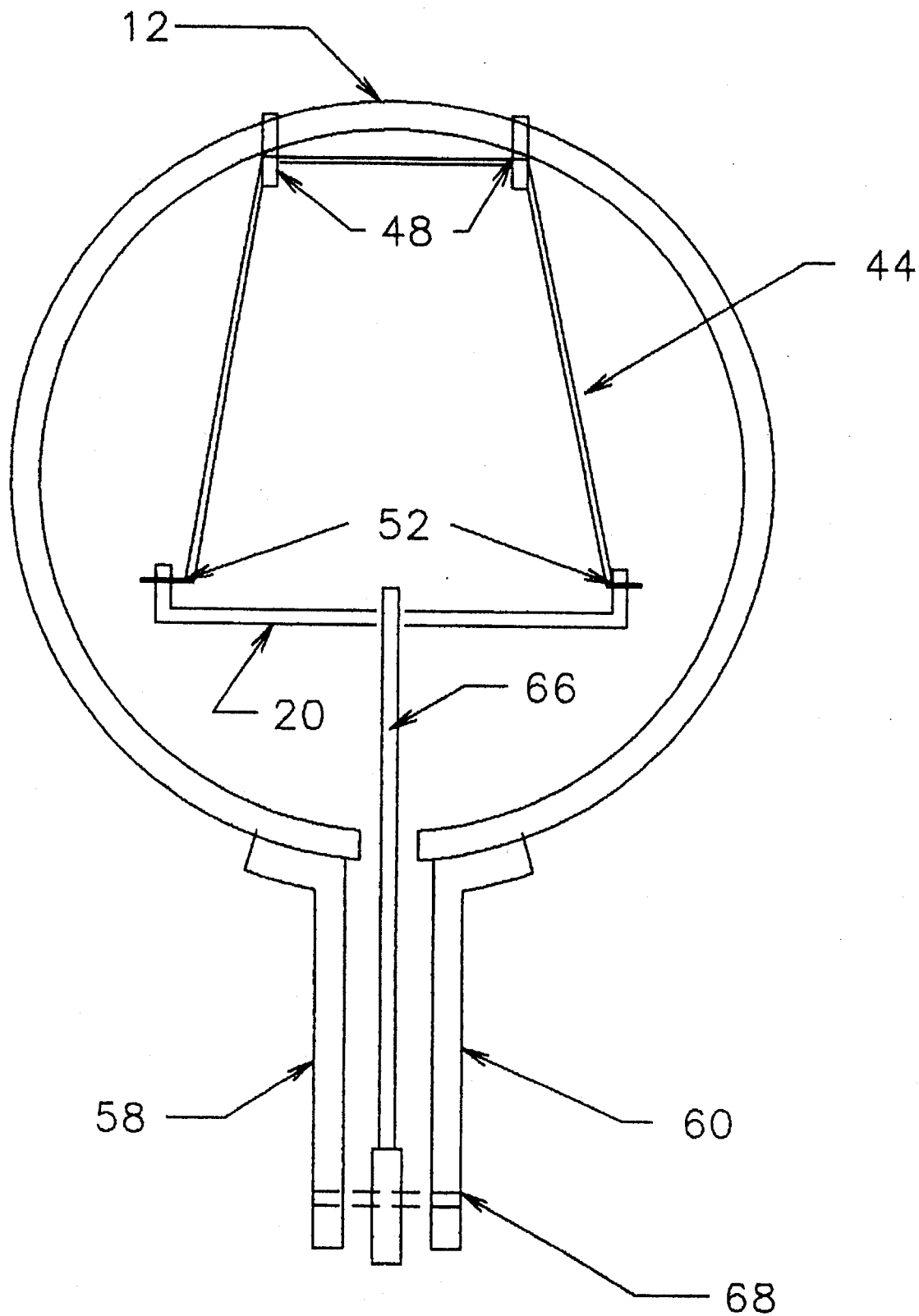
FIG. 4 is an end view of the instant invention.

In FIG. 3, a front view of the interior of the body 12 is shown; FIG. 4 depicts the body 12 from an end view. The vehicle platform 20 is suspended from the body 12 through use of U shaped hangers 42 and 44. In the preferred embodiment, the vehicle-platform 20 is 4 inches wide by 14 inches long, however adjustments can be made dependent upon the overall size of the body 12. The hangers 42 and 44 are attached to the body 12 through use of hook pairs 46 and 48 and to the vehicle platform 20 through use of pivot pairs 50 and 52. The hooks 46 and 48 can be replaced with eye hooks or any other device which would provide the freedom of movement for the hangers 42 and 44 similar to that provided by the hook pairs 46 and 48. The balance beam 18 is attached to the body 12 of the wind tunnel 10 by brackets 56, 58 and 60. The brackets 56, 58 and 60 are curved to contour to the body 12. The body 12 can rest on the brackets 56, 58 and 60. Alternatively, the body 12 can be affixed to the brackets 56, 58 and 60 through use of screws or an adhesive, dependent upon the choice of the manufacturer. The brackets 58 and 60, shown more clearly in FIG. 4, are two separate pieces affixed together with the pivot 68. The two piece construction allows the lever 66 to pivot as required in a centralized position. The lever 66 extends from a point adjacent the end of the vehicle platform 20 to the balance beam 18 where it is attached through use of rivet 68. The bracket 56 can either be a one-piece unit, or alternatively, two pieces in the same configuration as brackets 58 and 60. The bracket 56 is marked with a zero point 62 to provide leveling for the balance beam 18 to establish a tare at no weight. The balance beam 18 has a counter balance 74 and counter weight 70 which assists in maintaining a level position through counter levering the balance beam 18. The balance beam 18 is marked with a scale 64 which indicates the amount of drag, in grams, that the vehicle is being subjected to during use.

Formally, the drag on a body is a force, which is the product of the mass of the body and its acceleration, and should be reported as such in units of force, e.g., newtons, dynes, or pounds. The conditions here, particularly the constant acceleration due to gravity, however, permit reporting the force in terms of mass. If the actual force needs to be calculated for other reasons, the mass reading in kilograms can be multiplied by the gravitational constant, g, in meters per second per second to obtain the force in newtons. For example, a 10 g or 0.01 kg mass reading multiplied by g=9.81 m/s$^2$ translates to a force equal to 9.81 newtons.

The pointer 76 is affixed to the end of the balance beam 18 in a position to indicate the zero point 62 on the bracket 56. The beam weight 72 is used, in combination with the counter weight 70, to achieve a zero weight prior to the testing and to indicate the drag during use.

Prior to use of the wind tunnel 10, the fan 34 is activated and the balance weight 72 set at zero on the scale 64. The counter weight 70 is adjusted to place the pointer 76 at the zero point 62. Once the pointer 76 is level with the zero point 62, the window 38 is removed and the model placed on the vehicle platform 20. The U shaped hook pairs 46 and 48 in combination with the pivot pairs 50 and 52, allow the vehicle platform 20 to move horizontally. Once the window 38 is replaced, the fan 34 is activated, pulling the air through the air inlet 24 in the direction of arrow A. The force of the air drag upon the vehicle causes the vehicle platform 20 to move horizontally, thereby coming in contact with and moving the lever 66 in the direction of the air flow. The amount of movement of the lever 66 controls the amount of movement of upward movement of the balance beam 18, moving the pointer 76 off the zero point 62. Once the balance beam 18 has stabilized, the beam weight 72 is moved along the scale 64 to bring the pointer 76 back to the zero point 62. The position of the beam weight 72 along the scale 64 indicates the amount of drag to the vehicle measured in grams of resistance.

Figure 5:
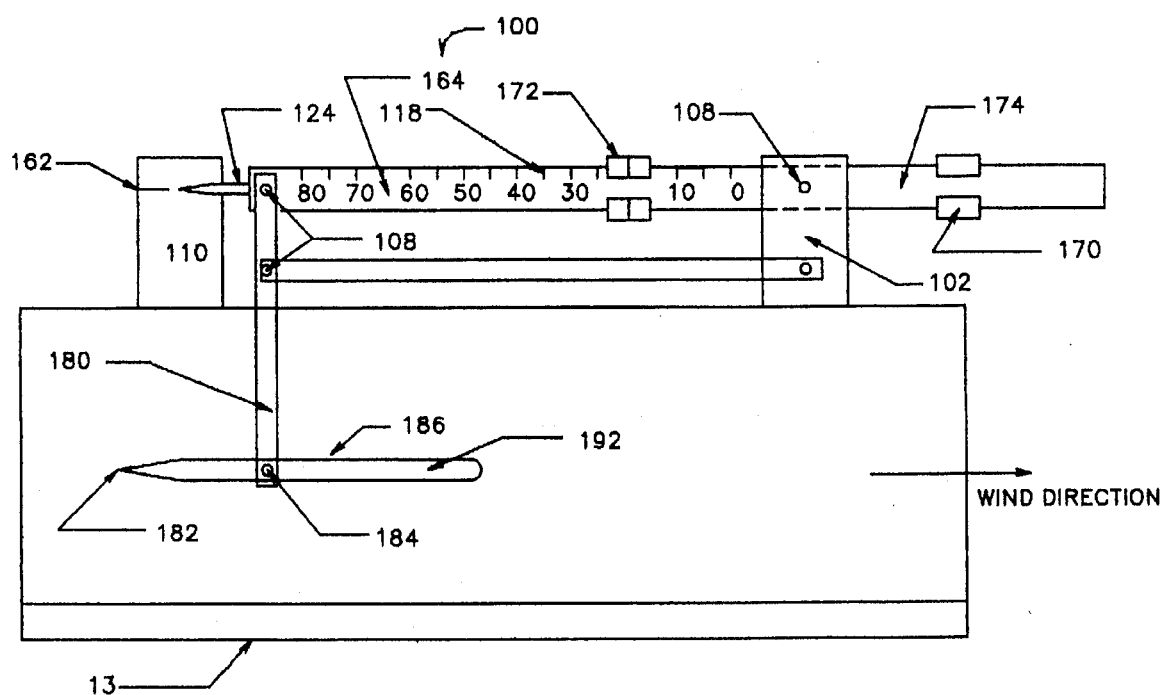
FIG. 5 is a front view of the wing lift attachment which connects to the instant invention.
Figure 7:
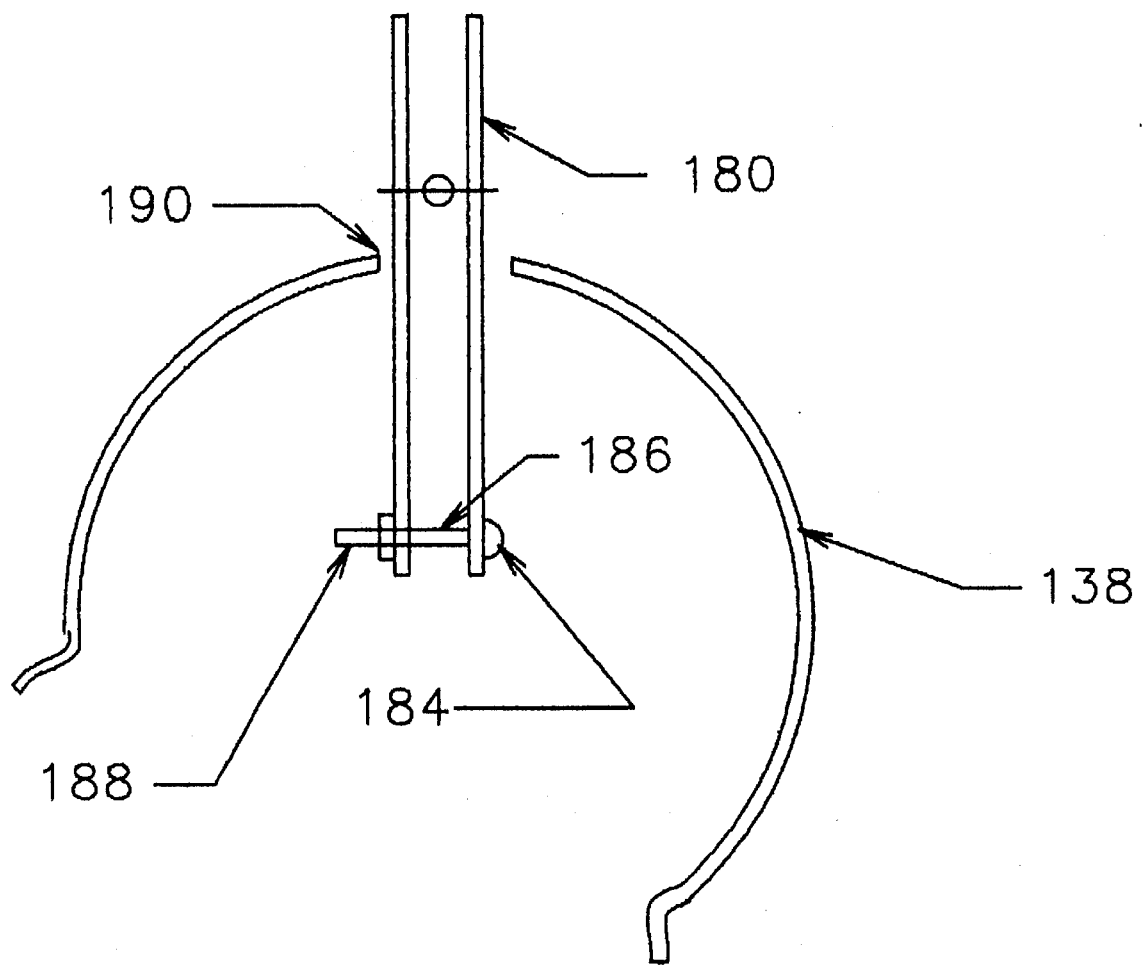
FIG. 7 is an end view of the wing lift attachment.

FIG. 5 illustrates the preferred attachment for measuring wing lift. The wing lift attachment 100 is manufactured in conjunction with window cover 138 which can be easily substituted for the transparent window cover 38 disclosed above. A balance beam scale 118, which has been constructed similar to the scale 18, is mounted on the window 138 in a position to be parallel with the earth in order to minimize resistance. Parallel to the balance beam scale 118 is a parallel bar 204. The balance beam scale 118 and parallel bar 204 are attached to the window 138 through a bracket 102, which is a two-part design as previously disclosed in FIG. 4. The balance beam 118 and parallel bar 204 bar 204 are attached to the bracket 102 through use of pivots 108 which allow for vertical movement. A second bracket 110 provides a zero Point 162 and is placed proximate the pointer 124. The balance beam 118 has a counter balance 174 and counter weight 170 which assist in maintaining a level position through counter levering the balance beam 118. The balance beam 118 is marked with a scale 164 in grams, indicating the amount of drag the test vehicle experiences during use. The pointer 124 is affixed to the end of the balance beam 118 in a position to indicate the 0 point 162 on the bracket 110. The beam weight 172 is used, in combination with the counter weight 170, to achieve a zero weight prior to the testing and to indicate the drag during use. A vertical brace pair 180 is affixed to either side of the balance beam 118 and parallel bar 204 adjacent to the pointer 124 at a pair of pivots 181, extending through a receiving slot 190 in the window 138, as shown in FIG. 7.

Figure 11:
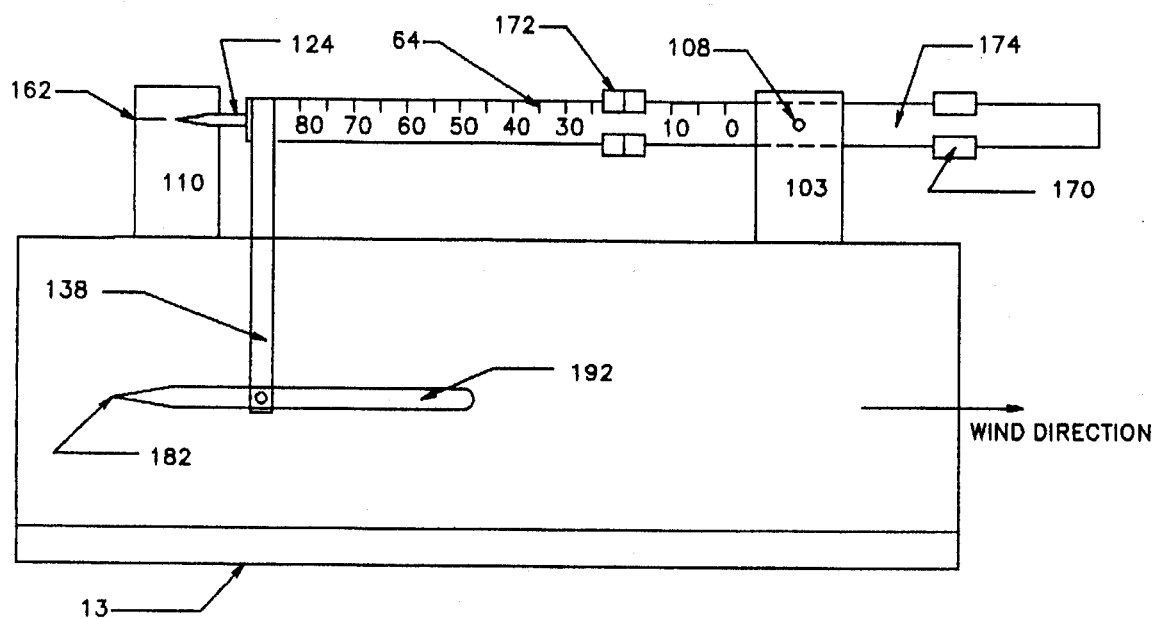
FIG. 11 is an alternate embodiment of the wing lift attachment of FIG. 5.

The parallel bar 204, the vertical brace pair 180, the balance beam 118, and the bracket 102, by virtue of being connected by the pivots 181 and 108, form a four-bar linkage. The bracket 102 acts as a "ground." The linkage permits the vertical brace pair 180 to be moved in a vertical direction while remaining parallel to the bracket 102. As illustrated in FIG. 11, substantially the same linkage without the parallel bar 204 can be used.

Figure 6:
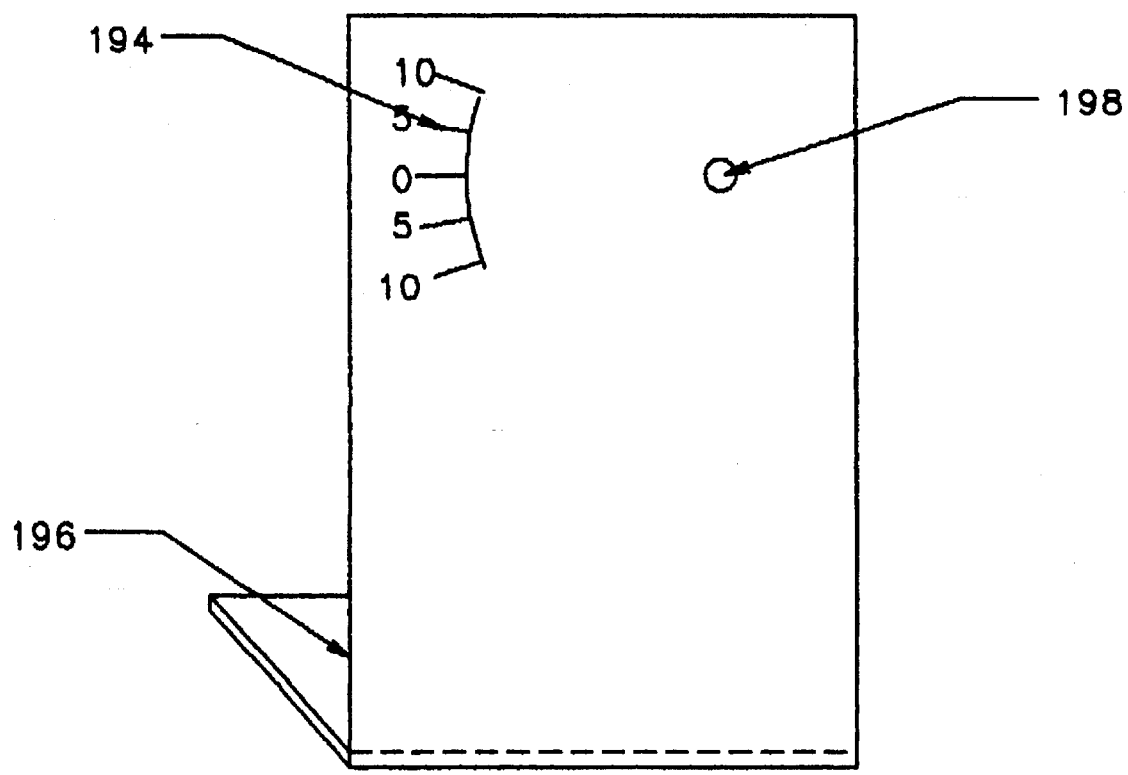
FIG. 6 is a front view of the protractor for use with the device of FIG. 5.

The protractor lever 186 lies between the vertical brace pair 180. The end of the vertical brace pair 180, as well as the protractor lever 186, are drilled to receive a pivot 184. The pivot 184 extends through the vertical brace pair 180 and the protractor lever 186 and forms the protractor mount 188. The protractor mounting hole 198 of the protractor 196, illustrated in FIG. 6, is placed on the end of the protractor mount 188 secured thereto by a screw or other means well known in the prior art. The protractor 196 is a L-shaped unit which is dimensioned to interact with the protractor pointer 182. The protractor lever 186 is a single unit, however, the ends will be referred to herein as the pointer 182 and the mounting rod 192. The pointer 182 is adjacent to the protractor scale 194 and indicates the amount of resistance of the wing section, which is attached to the mounting rod 192.

Figure 8:
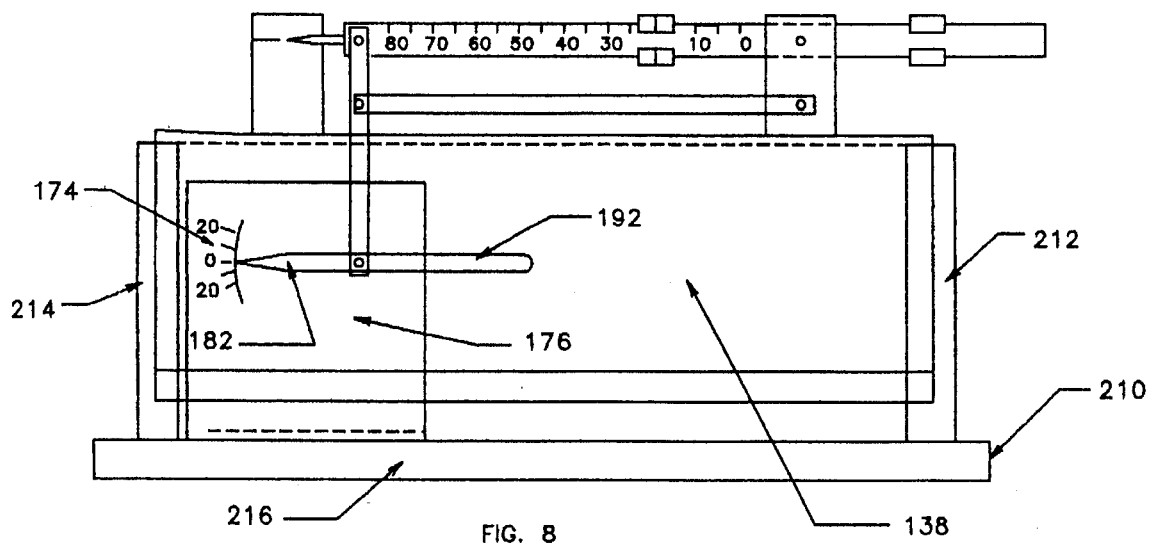
FIG. 8 is a front view of the assembled wing lift attachment in the storage rack.
Figure 9:
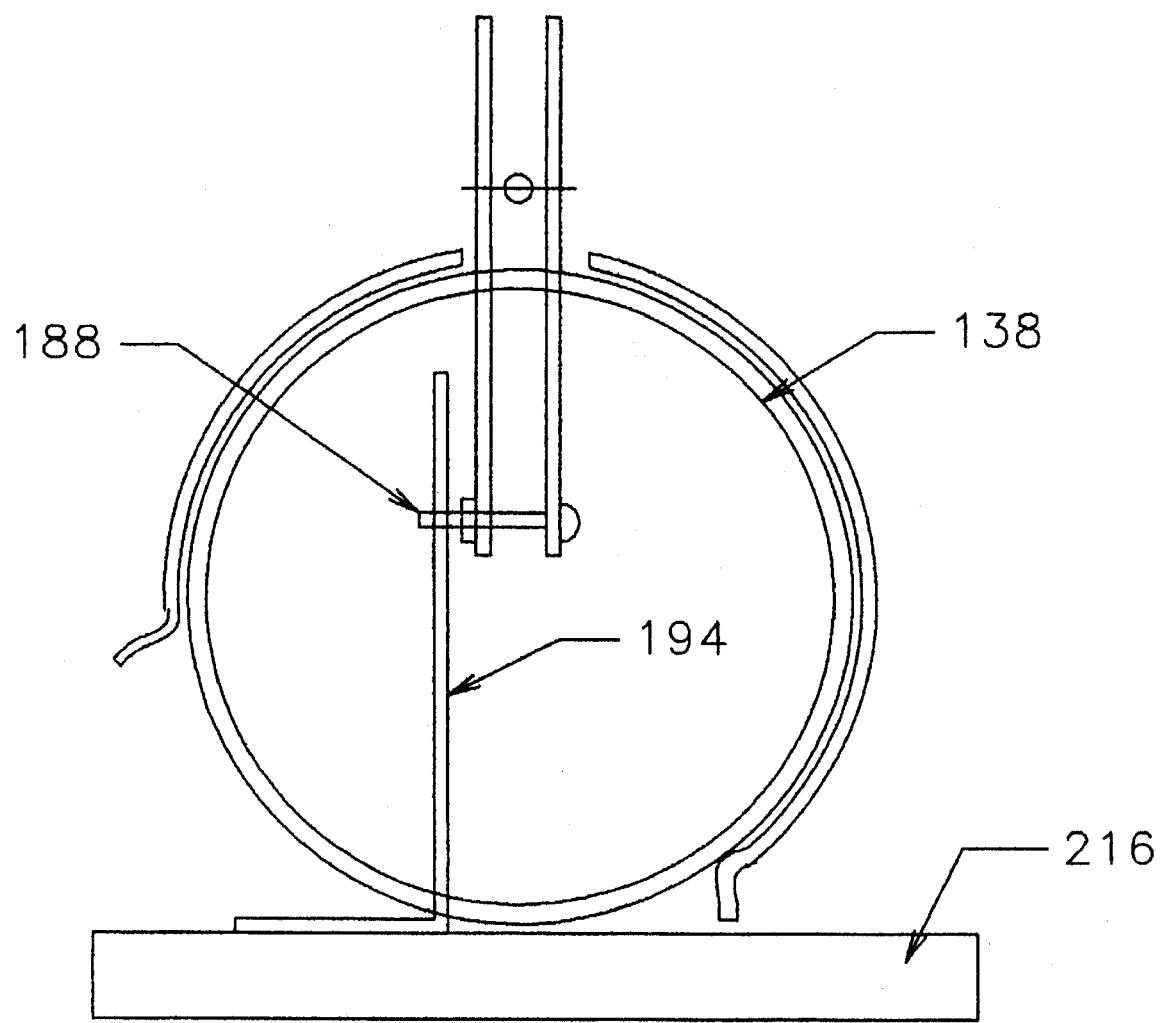
FIG. 9 is an end view of a portion of the wing lift attachment and base of FIG. 8.

FIGS. 8 and 9 illustrate the storage rack 210 which is designed to hold the wing lift attachment 100. The end brackets 212 and 214 are cylindrical to match the curve of the window 138, thereby allowing the window 138 to firmly snap over the brackets 212 and 214. The leg of the L shaped protractor 196 rests on the base 216 of the storage rack 210, assisting in providing stability and to prevent the window 138 from rotating.

The wing lift attachment 100 is prepared for testing while still in the storage rack 210. The wing section has been prepared for mounting by having a hole bored in its leading edge. The hole in the leading edge of the wing section allows it to slide over the mounting rod 192. The protractor 196 is mounted on the protractor mount 188 and secured thereto. The angle of attack, or the inclination of the wing with respect to the oncoming air stream, is adjusted and a reading is taken with the protractor pointer 182 on the protractor scale 194. The wing lift attachment 100, including the mounted wing section, is removed from the storage rack 210 and placed on the wind tunnel 10 over the window section 28. The beam weight 172 is moved to the zero setting on the scale 164 and the counter weight 170 is adjust to allow the pointer 124 to read level with the zero point 162. The weight adjustments counter act the weight of the wing section and allows the balance beam 118 to register accurate gram weight. The wind tunnel fan 34 is turned on, forcing the air around the wing. The beam weight 172 is adjusted along the scale 164 until the pointer 124 returns to the zero balance point 162. The reading on the scale 164 provides the grams of drag, with the accuracy being within ½ gram.

Figure 12:
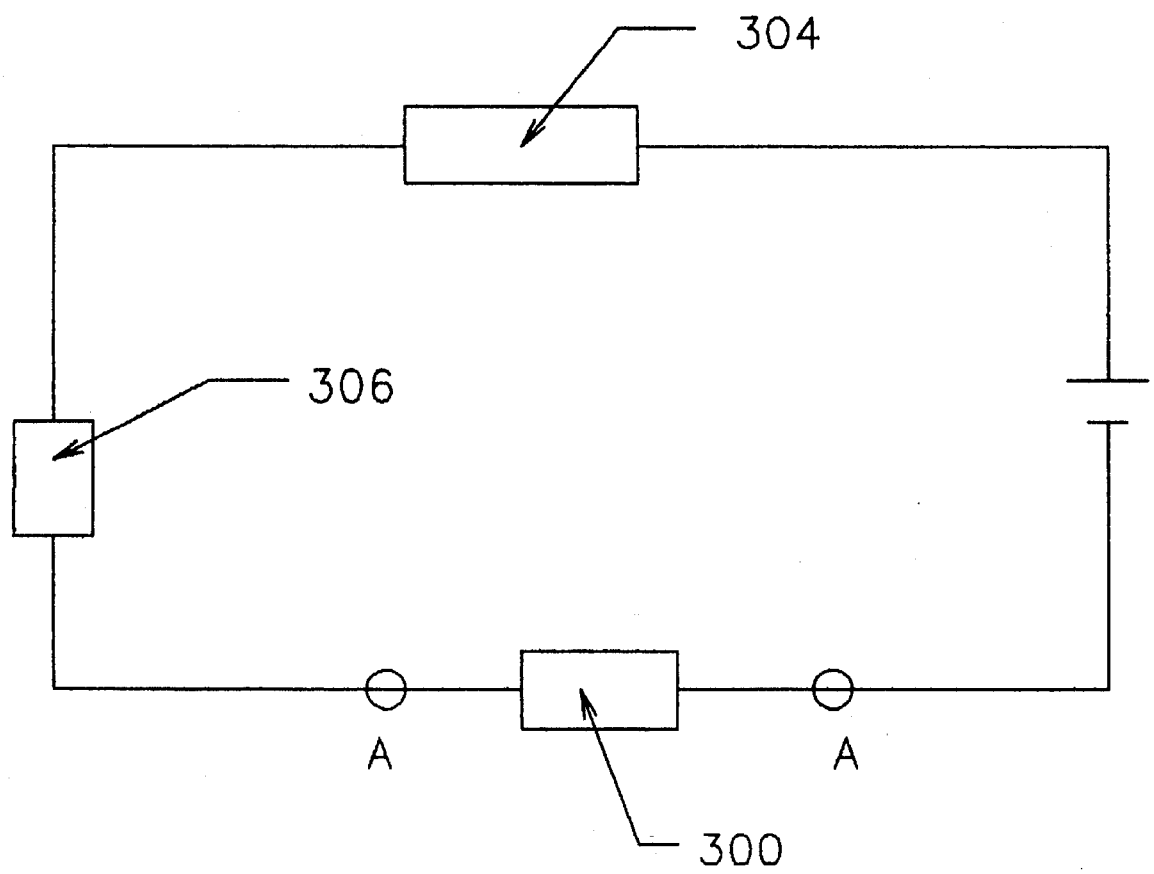
FIG. 12 is a schematic view of an alternate embodiment of the wing lift attachment of FIG. 5.
Figure 13:
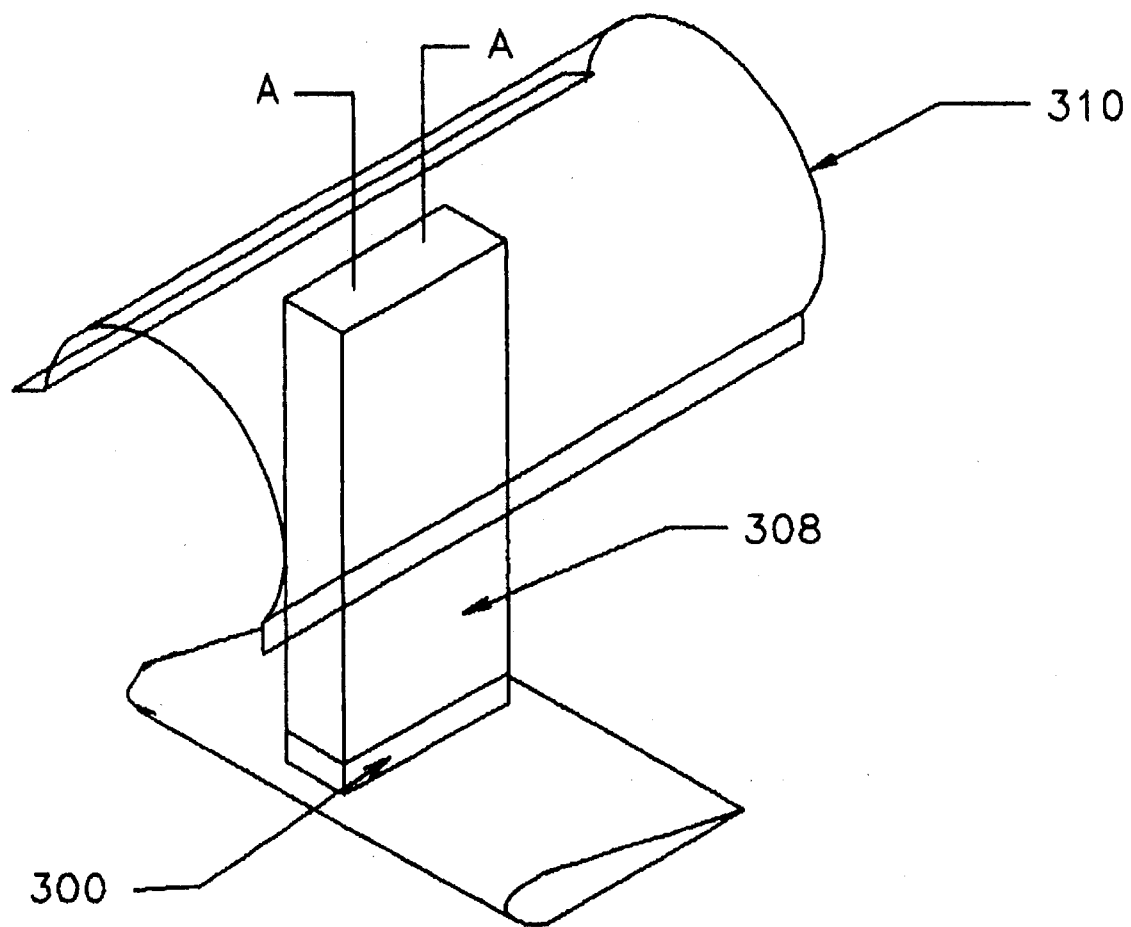
FIG. 13 is a perspective view of an alternate embodiment of the wing lift attachment of FIG. 5.

Although the balance beam system for measuring forces as disclosed above provides far more accurate readings than the spring scale measurement means used by others, other accurate alternatives exist. As illustrated in FIG. 12, one alternative embodiment of the present invention features a load cell 300 wired in series with a power supply 302, a sample and hold circuit. 304, and a digital readout 306 to measure and display the drag force generated by a wing section. As illustrated in FIG. 13, this assembly would be substituted for the balance beam scale 118 disclosed above. The wing is attached to the load cell 300, which attaches to the support arm 308. The support arm 308 attaches to the window section 310.

Since other modifications and changes varied to to fit particular operating requirements and environments will be apparent to those skilled in the art, the invention is not considered to be limited to the example chosen for the purposes of disclosure, and covers all changes and modifications which do not constitute true departures from the true spirit and scope of this invention.

What is claimed is:

1. A portable wind tunnel, comprising:

a test section, said test section being a hollow member having a substantially constant cross-sectional area, a first end, a second end, and a length therebetween;

a window area, said window area being a cut-out section in said test section and providing a top view and a side view of platform means;

a window panel, said window panel being transparent, dimensioned to close said cut-out section and removably positioned in said cut-out section, providing visibility of the interior of said test section;

a platform, said platform being movably attached to said interior of said test section proximate said window area;

balance beam measuring means, said measuring means being disposed proximate said test section and operatively connected to said platform, said measuring means registering the drag force on a body generated by said air flow through said test section, diffuser means, said diffuser having a diffuser inlet and a diffuser outlet, said diffuser inlet being attached to said first end of said test section and fitting proximate the periphery thereof, wherein said diffuser outlet has a greater cross-sectional flow area than said diffuser inlet;

a squirrel cage air flow generator, said air flow generator having an air inlet and an air outlet, wherein said air flow generator creates airflow in a direction through and parallel to said length of said test section;

flow straightening means, said flow straightening means being a honeycomb member positioned substantially normal to the direction of said flow and situated upstream from said air inlet; and a constrictor, said constrictor having a constrictor inlet and a constrictor outlet, said constrictor outlet being attached to said second end of said test section and fitting proximate the periphery thereof, wherein said constrictor inlet has a greater cross-sectional area than said constrictor outlet.

2. The portable wind tunnel as described in claim 1 wherein said wind tunnel further comprises:

airfoil testing means, said airfoil testing means comprising:

adjustment means, said adjustment means having a first end and a second end, said first end projecting through a surface created by said window panel, wherein said adjustment means allows adjustment to the position of said second end by manipulating said first end;

said measuring means being operatively connected to said adjustment means, wherein said measuring means registers and displays the force generated by said airflow on a body;

a protractor, said protractor being operatively connected to said adjustment means such that said protractor indicates the angular attitude of said second end of said adjustment means with respect to said length of said test section.

3. The portable wind tunnel as described in claim 1 further comprising a second air flow means wherein said air flow means is a second honeycomb member and is positioned within said test section downstream of said air flow generator.

4. The portable wind tunnel as described in claim 1 wherein said air inlet of said squirrel cage air flow generator is attached to and positioned proximate the periphery of said diffuser outlet, such that said airflow flows from said second end to said first end of said test section.

5. A portable wind tunnel, comprising:
   a test section, said test section being tubular and substantially straight, and having a substantially constant cross-sectional area, a first end, a second end, and a length therebetween;
   a window area, said window area being a cut-out section in said test section, said cut-out area simultaneously displaying a top view and a side view of said platform means, thereby providing visibility of the interior of said test section;
   a removable window panel, said removable window panel being being dimensioned to have a periphery at least as great as that of said cut-out section;
   a platform, said platform being movably attached to said interior of said test section proximate said window area;
   a diffuser, said diffuser having a diffuser inlet and a diffuser outlet, said diffuser inlet being attached to said first end of said test section and fitting proximate the periphery thereof, wherein said diffuser outlet has a greater cross-sectional flow area than said diffuser inlet;
   a squirrel cage air flow generator, said air flow generator having an air inlet and an air outlet, wherein said air flow generator creates an airflow in a direction parallel to and through said length of said test section, said air flow generator attaching to and fitting proximate the periphery of said diffuser outlet, such that said airflow flows from said second end to said first end of said test section;
   at least one flow straightening means, said flow straightening means being a honeycomb member and being situated upstream from said air inlet and substantially normal to the direction of said flow;
   a constrictor, said constrictor having a constrictor inlet and a constrictor outlet, said constrictor outlet being attached to said second end of said test section and fitting proximate the periphery thereof, wherein said constrictor inlet has a greater cross-sectional area than said constrictor outlet;
   measuring means, said measuring means being disposed proximate said test section and operatively connected to said platform, wherein said measuring means registers the drag force on a body generated by said air flow through said test section.

6. A portable wind tunnel, comprising:
   a test section, said test section being tubular and substantially straight, and having a substantially constant cross-sectional area, a first end, a second end, and a length therebetween;
   a window area, said window area being a cut-out section in said test section, said cut-out area simultaneously displaying a top view and a side view of said platform means, thereby providing visibility of the interior of said test section;
   a removable window panel, said removable window panel being being dimensioned to have a periphery at least as great as that of said cut-out section;
   a diffuser, said diffuser having a diffuser inlet and a diffuser outlet, said diffuser inlet being attached to said first end of said test section and fitting proximate the periphery thereof, wherein said diffuser outlet has a greater cross-sectional flow area than said diffuser inlet;
   a squirrel cage air flow generator, said air flow generator having an air inlet and an air outlet, wherein said air flow generator creates an airflow in a direction parallel to and through said length of said test section, said air flow generator attaching to and fitting proximate the periphery of said diffuser outlet, such that said airflow flows from said second end to said first end of said test section;
   at least one flow straightening means, said flow straightening means being a honeycomb member and being situated upstream from said air inlet and substantially normal to the direction of said flow;
   a constrictor, said constrictor having a constrictor inlet and a constrictor outlet, said constrictor outlet being attached to said second end of said test section and fitting proximate the periphery thereof, wherein said constrictor inlet has a greater cross-sectional area than said constrictor outlet;
   measuring means, said measuring means being disposed proximate said test section and operatively connected to said platform, wherein said measuring means registers the drag force on a body generated by said air flow through said test section;
   airfoil testing means, said airfoil testing means comprising:
      adjustment means, said adjustment means having a first end and a second end, said first end projecting through a surface created by said window panel, wherein said adjustment means allows said user to adjust the position of said second end by manipulating said first end;
      second measuring means, said second measuring means being operatively connected to said adjustment means, wherein said measuring means registers and displays the force generated by said airflow on a body;
      a protractor, said protractor being operatively connected to said adjustment means such that said protractor indicates the angular attitude of said second end of said adjustment means with respect to said length of said test section.

7. A method of determining the drag force on an object using a portable wind tunnel, said portable wind tunnel comprising;
   a test section, said test section being tubular and substantially straight, and having a substantially constant cross-sectional area, a first end, a second end, and a length therebetween;
   a window area, said window area being a cut-out section in said test section, said cut-out area simultaneously displaying a top view and a side view of said platform means, thereby providing visibility of the interior of said test section;
   a removable window panel, said removable window panel being being dimensioned to cover said cut-out section;
   platform means, said platform means being movably attached to said interior of said test section proximate said window area.
   a diffuser, said diffuser having a diffuser inlet and a diffuser outlet, said diffuser inlet being attached to said first end of said test section and fitting proximate the periphery thereof, wherein said diffuser outlet has a greater cross-sectional flow area than said diffuser inlet;
   an air flow generator, said air flow generator having an air inlet and an air outlet, wherein said air flow generator creates an airflow in a direction parallel to and through said length of said test section, said air flow generator attaching to and fitting proximate the periphery of said diffuser outlet, such that said airflow flows from said second end to said first end of said test section;

at least one flow straightening means, said flow straightening means being a honeycomb member and being situated upstream from said air inlet and substantially normal to the direction of said flow;

a constrictor, said constrictor having a constrictor inlet and a constrictor outlet, said constrictor outlet being attached to said second end of said test section and fitting proximate the periphery thereof, wherein said constrictor inlet has a greater cross-sectional area thorn said constrictor outlet;

measuring means, said measuring means being disposed proximate said test section and operatively connected to said platform means, wherein said measuring means registers the drag force on a body generated by said air flow through said test section;

the steps comprising:
a) calibrating said portable wind tunnel, the steps comprising:
  i) generating an air flow through and parallel to said test section by:
    A) activating said air flow generator;
    B) drawing air from the surroundings near said constrictor into said said constrictors;
    C) increasing the velocity of said air;
    D) straightening said air by passing said air through said at least one flow straightening means;
    E) guiding said air through said test section; and
    F) permitting said air to exit said portable wind tunnel downstream of said test section; and
  ii) ensuring said measuring means register a force of zero; and
  iii) deactivating said air flow generator;
b) removing said window panel of said test section;
c) placing said object upon said platform means within said test section;
d) replacing said window panel;
e) generating an air flow through and parallel to said test section, and over and around said object, by:
  i) activating said air flow generator;
  ii) drawing air from the surroundings near said constrictor into said said constrictor;
  ii) increasing the velocity of said air;
  iii) straightening said air by passing said air through said at least one flow straightening means;
  iv) guiding said air through said test section; and
  v) permitting said air to exit said portable wind tunnel downstream of said test section;
f) registering the drag force on said object as measured by said measuring means; and
g) displaying said drag force.

8. A method for determining the drag force on an airfoil section using a portable wind tunnel, said portable wind tunnel comprising a test section, said test section being tubular and substantially straight, and having a substantially constant cross-sectional area, a first end, a second end, and a length therebetween;

a window area, said window area being a cut-out section in said test section, said cut-out area simultaneously displaying a top view and a side view of said platform means, thereby providing visibility of the interior of said test section;

a removable window panel, said removable window panel being being dimensioned to cover said cut-out section;

a diffuser, said diffuser having a diffuser inlet and a diffuser outlet, said diffuser inlet being attached to said first end of said test section and fitting proximate the periphery thereof, wherein said diffuser outlet has a greater cross-sectional flow area than said diffuser inlet;

an air flow generator, said air flow generator having an air inlet and an air outlet, wherein said air flow generator creates an airflow in a direction parallel to and through said length of said test section, said air flow generator attaching to and fitting proximate the periphery of said diffuser outlet, such that said airflow flows from said second end to said first end of said test section;

at least one flow straightening means, said flow straightening means being a honeycomb member and being situated upstream from said air inlet and substantially normal to the direction of said flow;

a constrictor, said constrictor having a constrictor inlet and a constrictor outlet, said constrictor outlet being attached to said second end of said test section and fitting proximate the periphery thereof, wherein said constrictor inlet has a greater cross-sectional area than said constrictor outlet;

measuring means, said measuring means being disposed proximate said test section and operatively connected to said platform, wherein said measuring means registers the drag force on a body generated by said air flow through said test section airfoil testing means, said airfoil testing means comprising:

adjustment means, said adjustment means having a first end and a second end, said first end projecting through a surface created by said window panel, wherein said adjustment means allows said user to adjust the position of said second end by manipulating said first end;

second measuring means, said second measuring means being operatively connected to said adjustment means, wherein said measuring means registers and displays the force generated by said airflow on a body;

a protractor, said protractor being operatively connected to said adjustment means such that said protractor indicates the angular attitude of said second end of said adjustment means with respect to said length of said test section; the steps comprising:
a) calibrating said portable wind tunnel, the steps comprising:
  i) generating an air flow through and parallel to said test section by:
    A) activating said air flow generator;
    B) drawing air from the surroundings near said constrictor into said said constrictor;
    C) increasing the velocity of said air;
    D) straightening said air by passing said air through said at least one flow straightening means;
    E) guiding said air through said test section; and
    F) permitting said air to exit said portable wind tunnel downstream of said test section; and
  ii) ensuring said measuring means register a force of zero; and
  iii) deactivating said air flow generator;
b) removing said window panel of said test section;
c) placing said airfoil section on said second end of said adjustment means;
d) passing said first end of said adjustment means through said window panel;
e) replacing said window panel, whereby moving said first end of said adjustment means permits adjusting said airfoil test section within said test section;

f) adjusting said airfoil section to a desired position;
g) subjecting said airfoil section to an airflow, said airflow being generated by:
 i) drawing air from the surroundings into said portable wind tunnel;
 ii) guiding said air through a constrictor, whereby the velocity and uniformity of said air increases;
 iii) straightening said air by passing said air through at least one flow straightener;
 iv) guiding said air through said test section; and
 v) permitting said air to exit said portable wind tunnel downstream of said test section;
h) registering the drag force on said object as measured by said second measuring means; and
i) displaying said drag force.

* * * * *